(12) United States Patent
Luo et al.

(10) Patent No.: US 7,008,899 B2
(45) Date of Patent: Mar. 7, 2006

(54) LANTHANIDE-BASED CATALYST COMPOSITION FOR PRODUCING CIS-1,4-POLYDIENES

(75) Inventors: Steven Luo, Akron, OH (US); Michael W. Hayes, Canton, OH (US); Jeffery M. Hawkins, Newton Falls, OH (US)

(73) Assignee: Bridgestone Corporation, Tokyo (JP)

( * ) Notice: Subject to any disclaimer, the term of this patent is extended or adjusted under 35 U.S.C. 154(b) by 131 days.

(21) Appl. No.: 10/638,871

(22) Filed: Aug. 11, 2003

(65) Prior Publication Data

US 2005/0038215 A1 Feb. 17, 2005

(51) Int. Cl.
*C08F 4/58* (2006.01)

(52) U.S. Cl. .............. 502/131; 502/170; 502/154; 526/164; 526/335

(58) Field of Classification Search .......... 502/131, 502/154, 170; 526/164, 335
See application file for complete search history.

(56) References Cited

U.S. PATENT DOCUMENTS

| | | | |
|---|---|---|---|
| 3,297,667 A | 1/1967 | von Dohlen et al. | 260/82.1 |
| 3,541,063 A | 11/1970 | Throckmorton et al. | 260/82.1 |
| 3,794,604 A | 2/1974 | Throckmorton et al. | 252/431 |
| 4,242,232 A | 12/1980 | Sylvester et al. | 252/429 |
| 4,260,707 A | 4/1981 | Sylvester et al. | 526/114 |
| 4,429,089 A | 1/1984 | Pedretti et al. | 526/153 |
| 4,575,538 A | 3/1986 | Hsieh et al. | 525/244 |
| 5,585,440 A | 12/1996 | Yamada et al. | 525/193 |
| 6,001,478 A | 12/1999 | Apecetche et al. | 428/407 |
| 6,114,483 A | 9/2000 | Coughlin et al. | 526/172 |
| 6,130,299 A * | 10/2000 | Sone et al. | 526/89 |
| 6,136,919 A | 10/2000 | Zimmer et al. | 524/856 |
| 6,180,738 B1 | 1/2001 | Wang et al. | 526/200 |
| 6,191,226 B1 | 2/2001 | Matsuda et al. | 525/236 |
| 6,239,063 B1 | 5/2001 | Bogdan | 502/325 |
| 6,255,420 B1 | 7/2001 | Dietz, III et al. | 526/185 |
| 6,262,196 B1 | 7/2001 | Mecking | 526/114 |

OTHER PUBLICATIONS

Z. Shen et al., *Journal of Polymer Science: Polymer Chemistry Edition*, 1980, vol. 18, pp. 3345-3357.
Hsieh et al., *Rubber Chemistry and Technology*, 1985, vol. 58, pp. 117-145.

* cited by examiner

*Primary Examiner*—Caixia Lu
(74) *Attorney, Agent, or Firm*—Arthur M. Reginelli; Meredith E. Palmer

(57) ABSTRACT

A catalyst composition that is the combination of or the reaction product of ingredients comprising (a) a lanthanide compound, (b) an organoaluminum hydride, and (c) a tin halide compound.

27 Claims, No Drawings

LANTHANIDE-BASED CATALYST COMPOSITION FOR PRODUCING CIS-1,4-POLYDIENES

FIELD OF THE INVENTION

This invention relates to a lanthanide-based catalyst composition for the production of high cis-1,4-polydienes. The catalyst composition includes a lanthanide compound, an organoaluminum hydride, and a tin halide. The catalyst produces polymers having a narrow molecular weight distribution.

BACKGROUND OF THE INVENTION

Catalyst systems that comprise a lanthanide compound, an alkylating agent, and a halogen source are known to be useful for polymerizing conjugated dienes. Advantageously, these catalyst systems are more active in aliphatic solvents, which are the solvents of choice for environmental reasons, than in aromatic solvents. They are highly stereospecific and can produce conjugated diene polymers having high cis-1,4-linkage contents. The resulting cis-1,4-polydienes have a linear backbone structure and exhibit good green strength and excellent viscoelastic properties. The linear backbone structure is believed to provide better tensile properties, higher abrasion resistance, lower hysteresis loss, and outstanding fatigue resistance in rubber compounds. Therefore, these cis-1,4-polydienes are particularly suitable for use in tire components such as sidewall and tread.

Among various lanthanide-based catalyst systems for producing cis-1,4-polydienes, the most commercially useful includes a neodymium carboxylate as the lanthanide compound, either a trialkylaluminum or a dialkylaluminum hydride as the alkylating agent, and an alkylaluminum halide as the halogen source.

The use of dialkylaluminum hydrides as the alkylating agent is often preferred because less dialkylaluminum hydride—as compared to trialkylaluminum—is required to obtain a target molecular weight. This is primarily due to the fact that dialkylaluminum hydrides are better chain transfer agents than trialkylaluminums. Since the molecular weights of cis-1,4-polydienes produced by lanthanide catalysts generally increase with a decrease in the ratio of organoaluminum to lanthanide compound, less dialkylaluminum hydride can be used. Therefore, the use of dialkylaluminum hydrides offers the advantage of reducing the catalyst cost.

The use of dialkylaluminum hydrides, however, produces polymers that have a broad molecular weight distribution and contain a small fraction of ultrahigh molecular weight material. This unfortunately impacts the processing characteristics and viscoelastic properties of the polymers. Specifically, the broad molecular weight distribution generally results in higher hysteresis loss in rubber vulcanizates and therefore reduces fuel economy of tires. The ultrahigh molecular weight fraction causes high compound Mooney viscosity and high solution viscosity, both of which are undesirable. The high compound Mooney viscosity adversely affects the processability and scorch safety of rubber compounds, and the high solution viscosity is disadvantageous if the cis-1,4-polydiene is to be used in the production of high-impact polystyrene. Moreover, during the synthesis of cis-1,4-polydienes, the high solution viscosity causes difficulty in stirring and transferring the polymer cement and reduces the capacity for removing the heat of polymerization, which limits the polymer concentration that can be achieved in production.

Because the use of organoaluminum hydrides as the alkylating agent in lanthanide-based catalyst systems offers a significant cost advantage, there is a need to overcome the above-mentioned disadvantages associated with the use of organoaluminum hydrides.

SUMMARY OF THE INVENTION

In general the present invention provides a catalyst composition that is the combination of or the reaction product of ingredients comprising (a) an lanthanide compound, (b) an organoaluminum hydride, and (c) a tin halide compound.

The present invention also includes a catalyst composition formed by a process comprising the step of combining (a) a lanthanide compound, (b) an organoaluminum hydride, and (c) a tin halide compound.

The present invention further provides a process for forming conjugated diene polymers comprising the step of polymerizing conjugated diene monomers in the presence of a catalytically effective amount of a catalyst composition formed by combining (a) a lanthanide compound, (b) an organoaluminum hydride, and (c) a tin halide compound.

The present invention still further provides a process for narrowing the molecular weight distribution of cis-1,4-polydienes produced by using a lanthanide-based catalyst composition comprising an organoaluminum hydride as an alkylating agent, the method comprising polymerizing conjugated diene monomers in the presence of a catalytically effective amount of a catalyst composition formed by combining (a) a lanthanide compound, (b) an organoaluminum hydride, and (c) a tin halide compound.

It has now been unexpectedly found that when a lanthanide-based catalyst system comprising an organoaluminum hydride as the alkylating agent is used to polymerize conjugated diene monomers, the use of a tin halide in place of an alkylaluminum halide as the halogen source within the catalyst system enables the production of cis-1,4-polydienes having a narrow molecular weight distribution. The resulting cis-1,4-polydienes advantageously contain a smaller fraction of ultrahigh molecular weight material and therefore give better processability as well as lower solution viscosity as compared to the polymers produced with a lanthanide-based catalyst system comprising an alkylaluminum halide as the halogen source. Advantageously, tin halides are generally less expensive, non-pyrophoric, and easier to handle than alkylaluminum halides. In addition, unlike the catalyst systems that employ a tert-butyl halide as the halogen source, the catalyst system of the present invention does not require preforming and aging prior to use, since the catalyst has very high activity even when it is prepared in situ.

DETAILED DESCRIPTION OF ILLUSTRATIVE EMBODIMENTS

The catalyst composition of this invention is a combination of or the reaction product of ingredients comprising: (a) a lanthanide compound, (b) an organoaluminum hydride, and (c) a tin halide compound.

Various lanthanide compounds or mixtures thereof can be employed as ingredient (a) of the catalyst composition. Preferably, these compounds are soluble in a hydrocarbon such as aromatic hydrocarbons, aliphatic hydrocarbons, or cycloaliphatic hydrocarbons. Hydrocarbon-insoluble lanthanide compounds, however, are also useful since they can be suspended in the polymerization medium to form the catalytically active species. Further, a Lewis base such as tetrahydrofuran, acetylacetone, pyridine, or an alcohol may be employed as an aid for solubilizing these lanthanide compounds.

The lanthanide compounds include at least one atom of lanthanum, neodymium, cerium, praseodymium, promethium, samarium, europium, gadolinium, terbium, dysprosium, holmium, erbium, thulium, ytterbium, lutetium, and didymium. Preferably, these compounds include neodymium, lanthanum, samarium, or didymium. Didymium is a commercial mixture of rare-earth elements obtained from monazite sand.

The lanthanide atom in the lanthanide compounds can be in various oxidation states including but not limited to the 0, +2, +3, and +4 oxidation states. Trivalent lanthanide compounds, where the lanthanide atom is in the +3 oxidation state, are preferred. Suitable lanthanide compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, and organolanthanide compounds.

Neodymium compounds are most advantageously employed because the catalysts based on neodymium compounds generally give higher activity than the catalysts based on other lanthanide compounds. Thus, further discussion will focus on neodymium compounds, although those skilled in the art will be able to select similar compounds that are based upon other lanthanide metals.

Suitable neodymium carboxylates include neodymium formate, neodymium acetate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate, neodymium naphthenate, neodymium stearate, neodymium oleate, neodymium benzoate, and neodymium picolinate.

Suitable neodymium organophosphates include neodymium dibutyl phosphate, neodymium dipentyl phosphate, neodymium dihexyl phosphate, neodymium diheptyl phosphate, neodymium dioctyl phosphate, neodymium bis(1-methylheptyl)phosphate, neodymium bis(2-ethylhexyl) phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl)phosphate, neodymium butyl(2-ethylhexyl) phosphate, neodymium (1-methylheptyl) (2-ethylhexyl) phosphate, and neodymium (2-ethylhexyl)(p-nonylphenyl)phosphate.

Suitable neodymium organophosphonates include neodymium butyl phosphonate, neodymium pentyl phosphonate, neodymium hexyl phosphonate, neodymium heptyl phosphonate, neodymium octyl phosphonate, neodymium (1-methylheptyl)phosphonate, neodymium (2-ethylhexyl)phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl)phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium (1-methylheptyl)(1-methylheptyl)phosphonate, neodymium (2-ethylhexyl)(2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-nonylphenyl)(p-nonylphenyl)phosphonate, neodymium butyl(2-ethylhexyl)phosphonate, neodymium (2-ethylhexyl)butylphosphonate, neodymium (1-methylheptyl)(2-ethylhexyl)phosphonate, neodymium (2-ethylhexyl) (1-methylheptyl)phosphonate, neodymium (2-ethylhexyl) (p-nonylphenyl)phosphonate, and neodymium (p-nonylphenyl)(2-ethylhexyl)phosphonate.

Suitable neodymium organophosphinates include neodymium butylphosphinate, neodymium pentylphosphinate, neodymium hexylphosphinate, neodymium heptylphosphinate, neodymium octylphosphinate, neodymium (1-methylheptyl)phosphinate, neodymium (2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyl)phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl)phosphinate, neodymium butyl(2-ethylhexyl) phosphinate, neodymium (1-methylheptyl)(2-ethylhexyl) phosphinate, and neodymium (2-ethylhexyl)(p-nonylphenyl)phosphinate.

Suitable neodymium carbamates include neodymium dimethylcarbamate, neodymium diethylcarbamate, neodymium diisopropylcarbamate, neodymium dibutylcarbamate, and neodymium dibenzylcarbamate. Suitable neodymium dithiocarbamates include neodymium dimethyldithiocarbamate, neodymium diethyldithiocarbamate, neodymium diisopropyldithiocarbamate, neodymium dibutyldithiocarbamate, and neodymium dibenzyldithiocarbamate.

Suitable neodymium xanthates include neodymium methylxanthate, neodymium ethylxanthate, neodymium isopropylxanthate, neodymium butylxanthate, and neodymium benzylxanthate.

Suitable neodymium β-diketonates include neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Suitable neodymium alkoxides or aryloxides include neodymium methoxide, neodymium ethoxide, neodymium isopropoxide, neodymium 2-ethylhexoxide, neodymium phenoxide, neodymium nonylphenoxide, and neodymium naphthoxide.

The term "organolanthanide compound" refers to any lanthanide compound containing at least one lanthanide-carbon bond. These compounds are predominantly, though not exclusively, those containing cyclopentadienyl (Cp), substituted cyclopentadienyl, allyl, and substituted allyl ligands. Suitable organolanthanide compounds include $Cp_3Ln$, $Cp_2LnR$, $Cp_2LnCl$, $CpLnCl_2$, $CpLn(cyclooctatetraene)$, $(C_5Me_5)_2LnR$, $LnR_3$, $Ln(allyl)_3$, and $Ln(allyl)_2Cl$, where Ln represents a lanthanide atom, and R represents a hydrocarbyl group.

Various organoaluminum hydrides or mixtures thereof can be used as the component (b) of the catalyst system. The term "organoaluminum hydride" refers to any aluminum compound containing at least one aluminum-carbon bond and at least one aluminum-hydrogen bond. It is generally advantageous to employ organoaluminum hydrides that are soluble in the hydrocarbon polymerization medium.

A preferred class of organoaluminum hydrides are represented by the general formula $AlH_nR_{3-n}$ (n=1 or 2), where each R is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms.

Suitable types of organoaluminum hydrides include, but are not limited to, dihydrocarbylaluminum hydrides and hydrocarbylaluminum dihydrides. Dihydrocarbylaluminum hydrides are generally preferred.

Suitable dihydrocarbylaluminum hydrides include diethylaluminum hydride, di-n-propylaluminum hydride, diisopropylaluminum hydride, di-n-butylaluminum hydride, diisobutylaluminum hydride, di-t-butylaluminum hydride, di-n-pentylaluminum hydride, dineopentylaluminum hydride, di-n-hexylaluminum hydride, di-n-octylaluminum hydride, bis(2-ethylhexyl)aluminum hydride, dicyclohexylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride. Diisobutylaluminum hydride is particularly preferred due to its low cost and high solubility in hydrocarbons.

Suitable hydrocarbylaluminum dihydrides include ethylaluminum dihydride, n-propylaluminum dihydride, isopropylaluminum dihydride, n-butylaluminum dihydride, isobutylaluminum dihydride, t-butylaluminum dihydride, n-pentylaluminum dihydride, neopentylaluminum dihydride, n-hexylaluminum dihydride, n-octylaluminum dihydride, 2-ethylhexylaluminum dihydride, cyclohexylaluminum dihydride, phenylaluminum dihydride, p-tolylaluminum dihydride, and benzylaluminum dihydride.

Various tin halide compounds or mixtures thereof can be used as component (c) of the catalyst system. The term "tin halide compound" refers to any tin compound that contains at least one tin-halogen bond. Tin halide compounds that are soluble in hydrocarbons are preferred. Hydrocarbon-insoluble tin halide compounds, however, are also useful since they can be suspended in the polymerization medium to form the catalytically active species. Further, a Lewis base such as tetrahydrofuran, acetylacetone, pyridine, or an alcohol may be employed as an aid for solubilizing these tin halide compounds.

The tin atom in the tin halide compounds can be in various oxidation states including, but not limited to, the +2, +3, and +4 oxidation states. Divalent and tetravalent tin halide compounds are generally preferred. Suitable tin halide compounds can be either inorganic tin halides or organotin halides.

Specific examples of inorganic tin halides include tin(II) difluoride, tin(II) dichloride, tin(II) dibromide, tin(II) diiodide, tin(IV) tetrafluriode, tin(IV) tetrachloride, tin(IV) tetrabromide, tin(IV) tetraiodide, tin(IV) oxy difluoride, tin(IV) oxy dichloride, tin(IV) oxy dibromide, tin(IV) oxy diiodide, tin(IV) bis(acetylacetonate) difluoride, tin(IV) bis(acetylacetonate) dichloride, tin(IV) bis(acetylacetonate) dibromide, tin(IV) bis(acetylacetonate) diiodide, tin(IV) bis(hexafluoroacetylacetonate) difluoride, tin(IV) bis(hexafluoroacetylacetonate) dichloride, tin(IV) bis(hexafluoroacetylacetonate) dibromide, and tin(IV) bis(hexafluoroacetylacetonate) diiodide. Tin(IV) tetrachloride is particularly preferred due to its liquid state at ambient conditions, high solubility in hydrocarbon solvents and low cost.

The term "organotin halide" refers to any tin halide compound that contains at least one tin-carbon bond. Specific examples of organotin halides include trimethyltin fluoride, trimethyltin chloride, trimethyltin bromide, trimethyltin iodide, triethyltin fluoride, triethyltin chloride, triethyltin bromide, triethyltin iodide, tri-n-butyltin fluoride, tri-n-butyltin chloride, tri-n-butyltin bromide, tri-n-butyltin iodide, triphenyltin fluoride, triphenyltin chloride, triphenyltin bromide, triphenyltin iodide, tribenzyltin fluoride, tribenzyltin chloride, tribenzyltin bromide, tribenzyltin iodide, n-butyltin fluoride dihydroxide, n-butyltin chloride dihydroxide, n-butyltin bromide dihydroxide, n-butyltin iodide dihydroxide, dimethyltin difluoride, dimethyltin dichloride, dimethyltin dibromide, dimethyltin diiodide, diethyltin difluoride, diethyltin dichloride, diethyltin dibromide, diethyltin diiodide, di-n-butyltin difluoride, di-n-butyltin dichloride, di-n-butyltin dibromide, di-n-butyltin diiodide, diphenyltin difluoride, diphenyltin dichloride, diphenyltin dibromide, diphenyltin diiodide, dibenzyltin difluoride, dibenzyltin dichloride, dibenzyltin dibromide, dibenzyltin diiodide, methyltin trifluoride, methyltin trichloride, methyltin tribromide, methyltin triiodide, ethyltin trifluoride, ethyltin trichloride, ethyltin tribromide, ethyltin triiodide, n-butyltin trifluoride, n-butyltin trichloride, n-butyltin tribromide, n-butyltin triiodide, phenyltin trifluoride, phenyltin trichloride, phenyltin tribromide, phenyltin triiodide, benzyltin trifluoride, benzyltin trichloride, benzyltin tribromide, and benzyltin triiodide.

The lanthanide-based catalyst composition employed in this invention has very high catalytic activity over a wide range of catalyst concentrations and catalyst ingredient ratios. The polymer having the most desirable properties, however, is obtained within a narrower range of catalyst concentrations and catalyst ingredient ratios. Further, it is believed that the catalyst ingredients (a), (b), and (c) may interact to form an active catalyst species. Accordingly, the optimum concentration for any one catalyst ingredient is dependent upon the concentrations of the other catalyst ingredients. The molar ratio of the organoaluminum hydride to the lanthanide compound (Al/Ln) can be varied from about 3:1 to about 100:1, more preferably from about 4:1 to about 50:1, and even more preferably from about 5:1 to about 30:1. The molar ratio of the tin halide compound to the lanthanide compound (halogen atom/Ln) can be varied from about 0.5:1 to about 20:1, more preferably from about 1:1 to about 10:1, and even more preferably from about 2:1 to about 6:1. The term "molar ratio", as used herein, refers to the equivalent ratio of relevant components of the ingredients, e.g., the ratio of equivalents of halogen atoms in the tin halide compound to equivalents of lanthanide atoms in the lanthanide compound.

The catalyst composition is formed by combining or mixing the catalyst ingredients (a), (b), and (c). Although an active catalyst species is believed to result from this combination, the degree of interaction or reaction between the various ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

The catalyst composition can be formed by using one of the following methods:

First, the catalyst composition may be formed in situ by separately adding the three catalyst ingredients to the monomer solution or simply bulk monomer in either a stepwise or simultaneous manner. When the catalyst ingredients are added in a stepwise manner, it is preferable to first add the organoaluminum hydride, followed by the lanthanide compound, and then followed by the tin halide compound.

Second, the catalyst composition may be preformed. That is, the three catalyst ingredients are pre-mixed outside the polymerization system either in the absence of any conjugated diene monomer or, preferably, in the presence of a small amount of at least one conjugated diene monomer at an appropriate temperature, which is generally from about −20° C. to about 80° C. Mixtures of conjugated dienes may also be used. The amount of conjugated diene monomer that is used for preforming the catalyst can range from about 1 to about 500 moles, more preferably from about 5 to about 250 moles, and even more preferably from about 10 to about 100 moles per mole of the lanthanide compound. The resulting preformed catalyst composition can be aged, if desired, prior to being added to the monomer that is to be polymerized.

Third, the catalyst composition may be formed by using a two-stage procedure. The first stage involves reacting the lanthanide compound with the organoaluminum hydride either in the absence of any conjugated diene monomer or, preferably, in the presence of a small amount of at least one conjugated diene monomer at an appropriate temperature, which is generally from about −20° C. to about 80° C. The amount of conjugated diene monomer to be used in this first stage is generally the same as that amount used in the preforming of the catalyst as described above. In the second stage, the mixture prepared in the first stage and the tin halide compound are added in either a stepwise or simultaneous manner to the monomer that is to be polymerized.

When a solution of the catalyst composition or one or more of the catalyst ingredients is prepared outside the polymerization system as set forth in the foregoing methods, an organic solvent or carrier is preferably employed. The organic solvent may serve to dissolve the catalyst composition or ingredients, or the solvent may simply serve as a carrier in which the catalyst composition or ingredients may be suspended. The organic solvent is preferably inert to the catalyst composition. Useful solvents include aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Commercial mixtures of the above hydrocarbons may also be used. For environmental reasons, aliphatic and cycloaliphatic hydrocarbons are highly preferred.

The lanthanide-based catalyst composition of this invention exhibits very high catalytic activity for polymerizing conjugated dienes. Although one preferred embodiment of this invention is directed toward the polymerization of 1,3-butadiene into cis-1,4-polybutadiene, other conjugated dienes can also be polymerized to give polymers with a predominantly cis-1,4 microstructure. Some specific examples of other conjugated dienes that can be polymerized include isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Further, the process of this invention can also be utilized for the copolymerization of two or more conjugated dienes into copolymers having an essentially cis-1,4 microstructure.

The production of cis-1,4-polydienes according to this invention is accomplished by polymerizing conjugated diene monomers in the presence of a catalytically effective amount of the foregoing catalyst composition. The total catalyst concentration to be employed in the polymerization mass depends on the interplay of various factors such as the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalyst ingredients should be used. Generally, the amount of the lanthanide compound used can be varied from about 0.01 to about 2 mmol, more preferably from about 0.02 to about 1 mmol, and even more preferably from about 0.05 to about 0.5 mmol of lanthanide per 100 g of conjugated diene monomer.

The polymerization of conjugated diene monomers according to this invention is preferably carried out in an organic solvent as the diluent. Accordingly, a solution polymerization system may be employed in which both the monomer to be polymerized and the polymer formed are soluble in the polymerization medium. Alternatively, a precipitation polymerization system may be employed by choosing a solvent in which the polymer formed is insoluble. In both cases, an amount of organic solvent in addition to the amount of organic solvent that may be used in preparing the catalyst composition is usually added to the polymerization system. The additional organic solvent may be the same as or different from the organic solvent used in preparing the catalyst composition. It is preferable to select an organic solvent that is inert with respect to the catalyst composition. Exemplary hydrocarbon solvents have been set forth above. When a solvent is employed, the concentration of the monomer to be polymerized is not limited to a special range. Preferably, however, the monomer concentration at the beginning of the polymerization should be in a range of from about 3% to about 80% by weight, more preferably from about 5% to about 50% by weight, and even more preferably from about 10% to about 30% by weight.

The polymerization of conjugated dienes monomers according to this invention may also be carried out by means of bulk polymerization, wherein the monomer is polymerized in the absence or substantial absence of any solvent. The bulk polymerization can be conducted either in a condensed liquid phase or in a gas phase.

The polymerization of conjugated dienes monomers can be carried out as a batch process, a continuous process, or a semi-continuous process. In the semi-continuous process, the monomer is intermittently charged as needed to replace that monomer already polymerized. In any case, the polymerization is preferably conducted under anaerobic conditions by using an inert protective gas such as nitrogen, argon or helium, with moderate to vigorous agitation. The polymerization temperature may vary widely from a low temperature, such as −10° C. or below, to a high temperature such as 100° C. or above, with a preferred temperature range being from about 20° C. to about 100° C. The heat of polymerization may be removed by external cooling with a thermally controlled reactor jacket, internal cooling by evaporation and condensation of the monomer through the use of a reflux condenser connected to the reactor, or a combination of the two methods. Although the polymerization pressure employed may vary widely, a preferred pressure range is from about 1 atmosphere to about 10 atmospheres.

Once a desired conversion is achieved, the polymerization can be stopped by adding a polymerization terminator that inactivates the catalyst. Typically, the terminator employed is a protic compound, which includes, but is not limited to, an alcohol, a carboxylic acid, an inorganic acid, water, or a mixture thereof. An antioxidant such as 2,6-di-tert-butyl-4-methylphenol is usually added along with, before, or after the addition of the terminator. The amount of the antioxidant employed is typically in the range of 0.2% to 1% by weight of the polymer product. The terminator and the antioxidant can be used as neat materials or, if necessary, dissolved in a hydrocarbon solvent prior to being added to the polymerization system.

Advantageously, the polymer prepared by the polymerization process of this invention displays some degree of pseudo-living characteristics in that, upon completion of the polymerization, a portion of polymer chains possess reactive ends. Therefore, prior to adding the terminator and the antioxidant to the polymerization system as described above, a variety of coupling agents or functionalizing agents can be added to react with the reactive polymer chain ends so as to give modified cis-1,4-polydienes with tailored properties. Exemplary coupling or functionalizing agents include, but are not limited to, metal halides, metalloid halides, alkoxysilanes, imine-containing compounds, esters, ester-carboxylate metal complexes, alkyl ester carboxylate metal complexes, aldehydes or ketones, amides, isocyanates, isothiocyanates, imines, and epoxides. These types of coupling and functionalizing agents are described in, among other places, International Application Nos. PCT/US00/30743, PCT/US00/30875, and PCT/US00/30743; U.S. Pat. Nos. 4,906,706, 4,990,573, 5,064,910, 5,567,784, and 5,844,050; Japanese Patent Application Nos. 05-051406A, 05-059103A, 10-306113A, and 11-035633A, which are incorporated herein by reference. It is preferable to contact the pseudo-living polymer with the coupling or functionalizing agents prior to contacting the polymerization mixture with the terminator and the antioxidant. The amount of coupling or functionalizing agent is preferably in a range of from about 0.01 to about 100 moles, more preferably from about 0.1 to about 50 moles, and even more preferably from about 0.2 to about 25 moles per mole of the lanthanide compound.

When the polymerization has been stopped, the cis-1,4-polydiene product can be recovered from the polymerization mixture by using any conventional procedures of desolventization and drying that are known in the art. For instance, the polymer can be recovered by subjecting the polymer cement to steam desolventization, followed by drying the resulting polymer crumbs in a hot air tunnel. Alternatively, the polymer may be recovered by directly drum-drying the polymer cement. The content of the volatile substances in the dried polymer is preferably below 1% and more preferably below 0.5% by weight of the polymer.

The molecular weight distribution of the cis-1,4-polydienes produced by this invention is advantageously less than about 4.0, more preferably less than about 3.5, and even more preferably less than about 3.0. Most preferably, the molecular weight distribution is from about 2.0 to about 3.0.

The cis-1,4-polydienes prepared with the catalyst composition of this invention advantageously can have a cis-1,4-linkage content that is greater than about 60%, more advantageously greater than about 75%, still more advantageously greater than about 90%, and even more advantageously greater than about 95%. Also, these polymers may advantageously have a 1,2-linkage content that is less than about 7%, more advantageously less than 5%, still more advantageously less than 2%, and even more advantageously less than 1%. The cis-1,4- and 1,2-linkage content can be determined by infrared spectroscopy.

Advantageously, the cis-1,4-polydienes produced by the process of this invention exhibits excellent viscoelastic properties and is particularly useful in the manufacture of various tire components including, but not limited to, tire treads, sidewalls, subtreads, and bead fillers. The cis-1,4-polydienes can be used as all or part of the elastomeric component of a tire stock. When the cis-1,4-polydienes are used in conjunction with other rubbers to form the elastomeric component of a tire stock, these other rubbers may be natural rubber, synthetic rubbers, and mixtures thereof. Examples of synthetic rubber include polyisoprene, poly (styrene-co-butadiene), polybutadiene with low cis-1,4 linkage content, poly(styrene-co-butadiene-co-isoprene), and mixtures thereof. The cis-1,4-polydienes can also be used in the manufacture of hoses, belts, shoe soles, window seals, other seals, vibration damping rubber, and other industrial products.

In order to demonstrate the practice of the present invention, the following examples have been prepared and tested. The examples should not, however, be viewed as limiting the scope of the invention. The claims will serve to define the invention.

EXAMPLES

Example 1

An oven-dried 1-liter glass bottle was capped with a self-sealing rubber liner and a perforated metal cap. After the bottle was thoroughly purged with a stream of dry nitrogen, the bottle was charged with 104 g of hexanes and 229 g of a 1,3-butadiene/hexanes blend containing 21.8% by weight of 1,3-butadiene. The following catalyst ingredients were then charged into the bottle in the following order: (1) 0.85 mmol of diisobutylaluminum hydride, (2) 0.085 mmol of neodymium(III) versatate, and (3) 0.064 mmol of tin tetrachloride. The bottle was tumbled in a water bath maintained at 65° C. After 90 minutes, the polymerization was terminated by addition of 3 mL of isopropanol containing 0.30 g of 2,6-di-tert-butyl-4-methylphenol. The resulting polymer cement was coagulated with 3 liters of isopropanol containing 0.5 g of 2,6-di-tert-butyl-4-methylphenol, and then drum-dried. The yield of the polymer was 48.4 g (97% conversion). The Mooney viscosity ($ML_{1+4}$) of the polymer was determined to be 48 at 100° C. by using a Monsanto Mooney viscometer with a large rotor, a one-minute warm-up time, and a four-minute running time. The solution viscosity of the polymer was determined to be 848 centipoise at 25° C. by comparing the flow time of a 5.43% (w/w) polymer solution in toluene through a viscometric tube with the flow time required for a certified viscosity standard oil to flow through the same tube at the same temperature. As determined by gel permeation chromatography (GPC), the polymer had a number average molecular weight ($M_n$) of 129,000, a weight average molecular weight ($M_w$) of 347,000, and a molecular weight distribution ($M_w/M_n$) of 2.69. The infrared spectroscopic analysis of the polymer indicated a cis-1,4-linkage content of 98.4%, a trans-1,4-linkage content of 1.0%, and a 1,2-linkage content of 0.6%. The monomer charge, the amounts of the catalyst ingredients, and the properties of the resulting cis-1,4-polybutadiene are summarized in Table I.

Examples 2–4

In Examples 2–4, the procedure described in Example 1 was repeated except that the catalyst ingredient ratio was varied as shown in Table I. The monomer charge, the amounts of the catalyst ingredients, and the properties of the resulting cis-1,4-polybutadiene are summarized in Table I.

Examples 5–8

Comparative Examples

In Examples 5–8, the procedure described in Example 1 was repeated except that ethylaluminum dichloride was used in place of tin(IV) tetrachloride. The monomer charge, the amounts of the catalyst ingredients, and the properties of the resulting cis-1,4-polybutadiene are summarized in Table I.

agent is used to polymerize 1,3-butadiene, the use of a tin halide, i.e., tin(IV) tetrachloride, in place of an alkylaluminum halide, i.e., ethylaluminum dichloride, as the halogen source for the catalyst system gives rise to cis-1,4-polybutadiene having a narrower molecular weight distribution, while retaining the high catalyst activity. In addition, at the same Mooney viscosity, the polymer produced with the catalyst based on tin(IV) tetrachloride gives much lower solution viscosity than the polymer produced with the catalyst based on ethylaluminum dichloride. Furthermore, the GPC elution curves show that the polymer made with the catalyst based on tin(IV) tetrachloride contain a smaller ultrahigh molecular weight fraction than the polymer made with the catalyst based on ethylaluminum dichloride.

Examples 9–12

Comparative Examples

In Examples 9–12, the procedure described in Example 1 was repeated except that triisobutylaluminum was substituted for diisobutylalumin hydride, the catalyst ingredient ratio was varied as shown in Table II, and the polymerization was conducted for 50 minutes, with the bottle tumbled in a water bath maintained at 80° C. The monomer charge, the amounts of the catalyst ingredients, and the properties of the resulting cis-1,4-polybutadiene are summarized in Table II.

Examples 13–16

Comparative Examples

In Examples 13–16, the procedure described in Example 1 was repeated except that triisobutylaluminum was substituted for diisobutylalumin hydride, ethylaluminum dichloride was substituted for tin(IV) tetrachloride, the catalyst ingredient ratio was varied as shown in Table II, and the

TABLE I

| | Example No. | | | | | | | |
|---|---|---|---|---|---|---|---|---|
| | 1 | 2 | 3 | 4 | 5 | 6 | 7 | 8 |
| Hexanes (g) | 104 | 104 | 104 | 104 | 104 | 104 | 104 | 104 |
| 21.8% 1,3-butadiene/hexanes (g) | 229 | 229 | 229 | 229 | 229 | 229 | 229 | 229 |
| i-Bu$_2$AlH (mmol) | 0.85 | 0.94 | 1.02 | 1.11 | 0.85 | 0.94 | 1.02 | 1.11 |
| Nd(versatate)$_3$ (mmol) | 0.085 | 0.085 | 0.085 | 0.085 | 0.085 | 0.085 | 0.085 | 0.085 |
| SnCl$_4$ (mmol) | 0.064 | 0.064 | 0.064 | 0.064 | — | — | — | — |
| EtAlCl$_2$ (mmol) | — | — | — | — | 0.128 | 0.128 | 0.128 | 0.128 |
| Nd/Al/Cl molar ratio | 1:10:3 | 1:11:3 | 1:12:3 | 1:13:3 | 1:10:3 | 1:11:3 | 1:12:3 | 1:13:3 |
| Polymer yield after 90 min. at 65° C. | 97% | 98% | 97% | 97% | 97% | 96% | 95% | 95% |
| Mooney viscosity (ML$_{1+4}$) | 48 | 39 | 36 | 29 | 48 | 39 | 35 | 30 |
| M$_n$ | 129,000 | 118,000 | 116,000 | 98,000 | 114,000 | 102,000 | 94,000 | 84,000 |
| M$_w$ | 347,000 | 315,000 | 301,000 | 282,000 | 387,000 | 348,000 | 334,000 | 320,000 |
| MWD (M$_w$/M$_n$) | 2.69 | 2.68 | 2.60 | 2.89 | 3.40 | 3.43 | 3.55 | 3.80 |
| Solution viscosity (centipoise) | 848 | 462 | 407 | 326 | 1890 | 1108 | 943 | 686 |
| Polymer microstructure by IR: | | | | | | | | |
| cis-1,4-linkage content (%) | 98.4 | 98.0 | 97.7 | 97.7 | 98.3 | 97.9 | 97.9 | 97.7 |
| trans-1,4-linkage content (%) | 1.0 | 1.3 | 1.5 | 1.5 | 1.0 | 1.3 | 1.3 | 1.5 |
| 1,2-linkage content (%) | 0.6 | 0.7 | 0.8 | 0.8 | 0.7 | 0.8 | 0.8 | 0.8 |

A comparison of the analytical data of the cis-1,4polybutadiene products obtained in Examples 1–4 with those obtained in Examples 5–8 indicates that when a lanthanide-based catalyst system comprising an organoaluminum hydride, i.e., diisobutylaluminum hydride, as the alkylating polymerization was conducted for 50 minutes, with the bottle tumbled in a water bath maintained at 80° C. The monomer charge, the amounts of the catalyst ingredients, and the properties of the resulting cis-1,4-polybutadiene are summarized in Table II.

TABLE II

| | Example No. | | | | | | | |
|---|---|---|---|---|---|---|---|---|
| | 9 | 10 | 11 | 12 | 13 | 14 | 15 | 16 |
| Hexanes (g) | 104 | 104 | 104 | 104 | 104 | 104 | 104 | 104 |
| 21.8% 1,3-butadiene/hexanes (g) | 229 | 229 | 229 | 229 | 229 | 229 | 229 | 229 |
| i-Bu$_3$Al (mmol) | 1.87 | 2.04 | 2.21 | 2.38 | 1.70 | 1.87 | 2.04 | 2.21 |
| Nd(versatate)$_3$ (mmol) | 0.085 | 0.085 | 0.085 | 0.085 | 0.085 | 0.085 | 0.085 | 0.085 |
| SnCl$_4$ (mmol) | 0.064 | 0.064 | 0.064 | 0.064 | — | — | — | — |
| EtAlCl$_2$ (mmol) | — | — | — | — | 0.128 | 0.128 | 0.128 | 0.128 |
| Nd/Al/Cl molar ratio | 1:22:3 | 1:24:3 | 1:26:3 | 1:28:3 | 1:20:3 | 1:22:3 | 1:24:3 | 1:26:3 |
| Polymer yield after 50 min. at 80° C. | 95% | 96% | 96% | 96% | 96% | 96% | 96% | 97% |
| Mooney viscosity (ML$_{1+4}$) | 49 | 42 | 39 | 33 | 47 | 43 | 37 | 33 |
| M$_n$ | 131,000 | 124,000 | 116,000 | 106,000 | 125,000 | 115,000 | 108,000 | 110,000 |
| M$_w$ | 349,000 | 332,000 | 318,000 | 293,000 | 341,000 | 325,000 | 308,000 | 304,000 |
| MWD (M$_w$/M$_n$) | 2.66 | 2.68 | 2.74 | 2.77 | 2.72 | 2.82 | 2.85 | 2.76 |
| Solution viscosity (centipoise) | 1138 | 830 | 655 | 461 | 834 | 753 | 529 | 516 |
| Polymer microstructure by IR: | | | | | | | | |
| cis-1,4-linkage content (%) | 98.1 | 97.9 | 98.2 | 97.5 | 97.8 | 97.5 | 97.5 | 97.4 |
| trans-1,4-linkage content (%) | 1.1 | 1.3 | 1.1 | 1.6 | 1.4 | 1.6 | 1.6 | 1.8 |
| 1,2-linkage content (%) | 0.8 | 0.8 | 0.7 | 0.9 | 0.8 | 0.9 | 0.9 | 0.8 |

A comparison of the analytical data of the cis-1,4-polybutadiene products obtained in Examples 9–12 with those obtained in Examples 13–16 indicates that when a lanthanide-based catalyst system comprising a trihydrocarbylaluminum, i.e., triisobutylaluminum, as the alkylating agent is used to polymerize 1,3-butadiene, the use of tin(IV) tetrachloride or ethylaluminum dichloride as the halogen source for the catalyst system gives rise to cis-1,4-polybutadiene having essentially the same molecular weight distribution. Therefore, only when an organoaluminum hydride is used as the alkylating agent does the use of a tin halide compound offer the advantage of reducing molecular weight distribution.

Various modifications and alterations that do not depart from the scope and spirit of this invention will become apparent to those skilled in the art. This invention is not to be duly limited to the illustrative embodiments set forth herein.

What is claimed is:

1. A catalyst composition that is the combination of or the reaction product of ingredients comprising:
   (a) a lanthanide compound;
   (b) an organoaluminum hydride; and
   (c) a tin halide compound.

2. The composition of claim 1, where said tin halide compound is tin(II) difluoride, tin(II) dichloride, tin(II) dibromide, tin(II) diiodide, tin(IV) tetrafluriode, tin(IV) tetrachloride, tin(IV) tetrabromide, tin(IV) tetraiodide, tin(IV) oxy difluoride, tin(IV) oxy dichloride, tin(IV) oxy dibromide, tin(IV) oxy diiodide, tin(IV) bis(acetylacetonate) difluoride, tin(IV) bis(acetylacetonate) dichloride, tin(IV) bis(acetylacetonate) dibromide, tin(IV) bis(acetylacetonate) diiodide, tin(IV) bis(hexafluoroacetylacetonate) difluoride, tin(IV) bis(hexafluoroacetylacetonate) dichloride, tin(IV) bis(hexafluoroacetylacetonate) dibromide, tin(IV) bis(hexafluoroacetylacetonate) diiodide, or a mixture thereof.

3. The composition of claim 1, where said tin halide compound is trimethytin fluoride, trimethyltin chloride, trimethyltin bromide, trimethyltin iodide, triethyltin fluoride, triethyltin chloride, triethyltin bromide, triethyltin iodide, tn-n-butyltin fluoride, tri-n-butyltin chloride, tri-n-butyltin bromide, tri-n-butyltin iodide, triphenyltin fluoride, triphenyltin chloride, triphenyltin bromide, triphenyltin iodide, tribenzyltin fluoride, tribenzyltin chloride, tribenzyltin bromide, tribenzyltin iodide, n-butyltin fluoride dihydrouide, n-butyltin chloride dihydroxide, n-butyltin bromide dihydroxide, n-butyltin iodide dihydroxide, dimethyltin difluoride, dimethyltin dichloride, dimethyltin dibromide, dimethyltin diiodide, diethytin difluoride, diethyltin dichloride, diethyltin dibromide, diethyltin diibodide, di-n-butyltin difluoride, di-n-butyltin dichloride, di-n-butyltin dibromide, di-n-butyltin diiodide, diphenyltin difluoride, diphenyltin dichloride, diphenyltin dibromide, diphenyltin diiodide, dibenzytin difluoride, dibenayltin dichloride, dibenayltin dibromide, dibenzyltin diiodide, methyltin trifluoride, methyltin trichioride, methyltin tribromide, methyltin triiodide, ethyltin trifluoride, ethyltin trichloride, ethyltin tribromide, ethyltin triiodide, n-butyltin trifluoride, n-butyltin trichioride, n-butyltin tribromide, n-butylrin triiodide, phenyltin trifluoride, phenyltin trichioride, phenyltin tribromide, phenyltin triiodide, benzyltin trifluoride, benzyltin trichioride, benzyltin tribromide, benzyltin triiodide, or a mixture thereof.

4. The composition of claim 1, where the organoaluminum hydride is diethylaluminum hydride, di-n-propylaluminum hydride, diisopropylaluminum hydride, di-n-butylaluminum hydride, diisobutylaluminum hydride, di-t-butylaluminum hydride, di-n-pentylaluminum hydride, dineopentylaluminum hydride, di-n-hexylaluminum hydride, di-n-octylaluminum hydride, bis (2-ethyihexyl) aluminum hydride, dicyclohexylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, benzyl-n-octylaluminum hydride, or a mixture thereof.

5. The composition of claim 1, where the organoaluminum hydride is ethylaluminum dihydride, n-propylaluminum dihydride, isopropylaluminum dihydride, n-butylaluminum dihydride, isobutylaluminum dihydride, t-butylaluminum dihydride, n-pentylaluminum dihydride, neopentylaluminum dihydride, n-hexylaluminum dihydride, n-octylaluminum dihydride, 2-ethyihexylaluminum dihydride, cyclohexylaluminum dihydride, phenylaluminum dihydride, p-tolylaluminum dihydride, benzylaluminum dihydride, or a mixture thereof.

6. The composition of claim 1, where said lanthanide compound is a neodymium carboxylate, neodymium organophosphate, neodymium organophosphonate, neodymium organophosphinate, neodymium carbamate, neodymium dithiocarbamate, neodymium xanthate, neodymium β-diketonate, neodymium alkoxide or aryloxide, neodymium halide, neodymium pseudo-halide, neodymium oxyhalide, organoneodymium compound, or mixture thereof.

7. The composition of claim 1, where the lanthanide compound is a neodymium carboxylate, the organoaluminum hydride is diisobutylaluminum hydride, and the tin halide compound is tin(IV) tetrachloride.

8. The composition of claim 1, where the molar ratio of said tin halide compound to said lanthanide compound is about 0.5:1 to about 20:1, and where the molar ratio of the organoaluminum hydride to the lanthanide compound is about 3:1 to about 100:1.

9. The composition of claim 1, where the molar ratio of said tin halide compound to said lanthanide compound is about 1:1 to about 10:1, and where the molar ratio of the organoaluminum hydride to the lanthanide compound is about 4:1 to about 50:1.

10. The composition of claim 1, where the (a) lanthanide compound, the (b) organoaluminum hydride, and the (c) tin halide compound are combined in the presence of a conjugated diene monomer.

11. A catalyst composition formed by a process comprising the step of combining:
    (a) a lanthanide compound;
    (b) an organoaluminum hydride; and
    (c) a tin halide compound.

12. The composition of claim 11, where the (a) lanthanide compound, the (b) organoaluminum hydride, and the (c) tin halide compound are combined in the presence of a conjugated diene monomer.

13. A process for forming conjugated diene polymers comprising the step of: polymerizing conjugated diene monomers in the presence of a catalytically effective amount of a catalyst composition formed by combining:
    (a) a lanthanide compound;
    (b) an organoaluminum hydride; and
    (c) a tin halide compound.

14. The process of claim 13, where said catalytically effective amount includes from about 0.01 to about 2.0 mmol of lanthanide compound per 100 g of conjugated diene monomer.

15. The process of claim 13, where said catalytically effective amount includes from about 0.02 to about 1.0 mmol of lanthanide compound per 100 g of conjugated diene monomer.

16. The process of claim 13, where said conjugated diene monomer is 1,3-butadiene.

17. The process of claim 13, where said lanthanide compound, said organoaluminum hydride, and said tin halide compound are combined in the presence of at least one conjugated diene monomer.

18. The process of claim 17, where the molar ratio of said tin halide compound to said lanthanide compound is 0.5:1 to about 20:1, and where the molar ratio of the organoaluminum hydride to the lanthanide compound is 3:1 to about 100:1.

19. The process of claim 18, where the lanthanide compound is a neodymium carboxylate, the organoaluminum hydride is diisobutylaluminum hydride, and the tin halide compound is tin(IV) tetrachloride.

20. A process for narrowing the molecular weight distribution of cis-1,4-polydienes produced by using a lanthanide-based catalyst composition comprising an organoaluminum hydride as an alkylating agent, the method comprising:
    polymerizing conjugated diene monomers in the presence of a catalytically effective amount of a catalyst composition formed by combining:
    (a) a lanthanide compound;
    (b) an organoaluminum hydride; and
    (c) a tin halide compound.

21. A catalyst composition that is the combination of or the reaction product of ingredients consisting essentially of:
    (a) a lanthanide compound;
    (b) an organoaluminum hydride; and
    (c) a tin halide compound.

22. The catalyst composition of claim 1, where the tin halide compound includes tin tetrachloride.

23. The catalyst composition of claim 22, where the organoaluminum hydride compound includes diisobutylaluminum hydride.

24. The catalyst composition of claim 23, where the lanthanide compound is neodymium versatate.

25. The catalyst composition of claim 24, where the catalyst composition includes from about 0.85 to about 1.11 mmol of the diisobutylaluminum hydride, about 0.085 mmol of the neodymium versatate, and about 0.064 mmol of the tin tetrachloride.

26. The catalyst composition 24, where the molar ratio of neodymium to chloride is from about 1:10:3 to about 1:13:3.

27. A catalyst composition for the solution or liquid phase polymerization of conjugated dienes, where the catalyst composition is the combination of or the reaction product of ingredients comprising:
    (a) a lanthanide compound;
    (b) an organoaluminum hydride; and
    (c) a tin halide compound.

* * * * *